Feb. 21, 1956  F. F. HANSEN  2,735,382
CROSS OR DIAGONAL SHEETING OF DOUGH
Filed Dec. 27, 1951  2 Sheets-Sheet 1
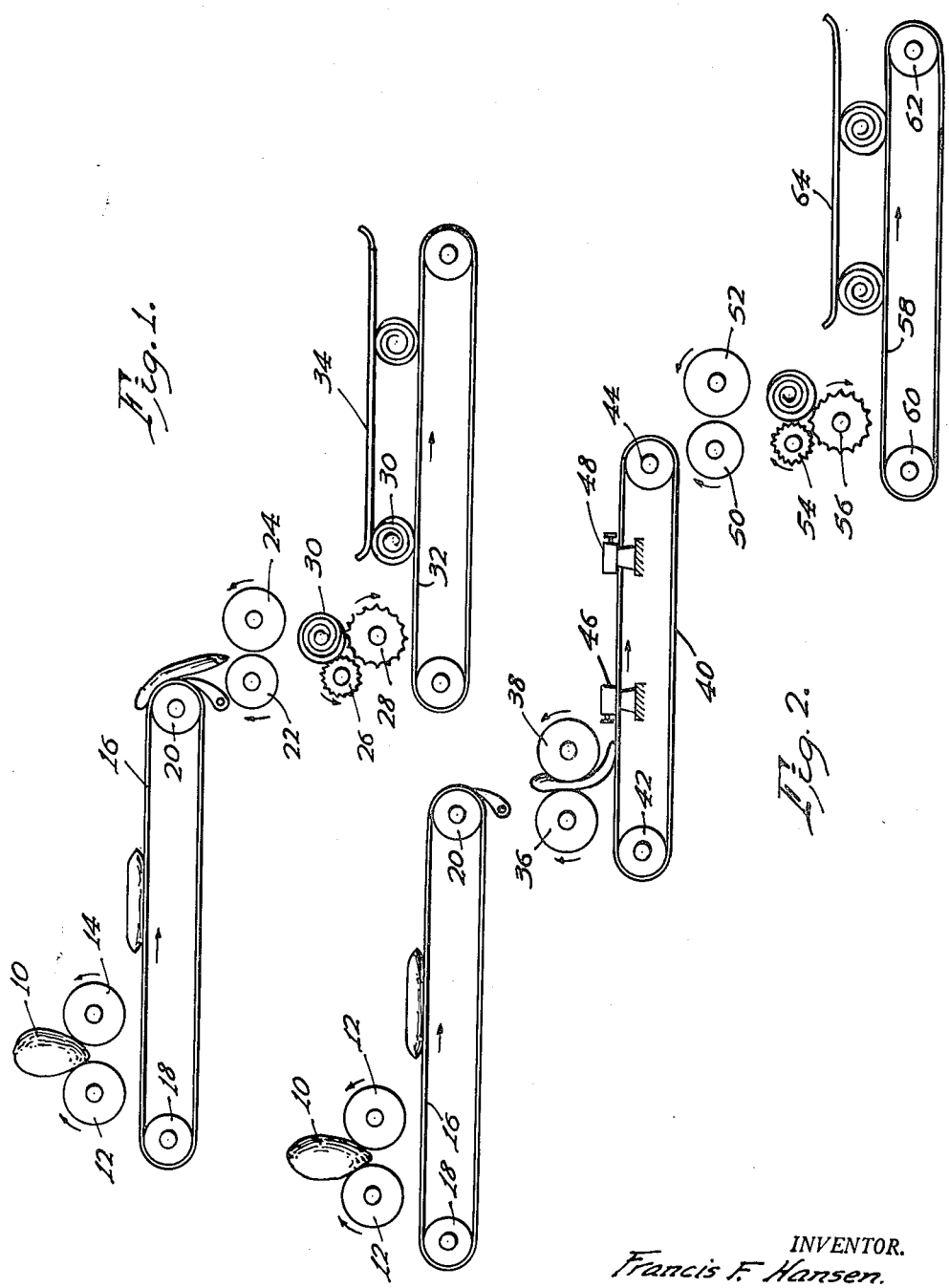

Feb. 21, 1956     F. F. HANSEN     2,735,382
CROSS OR DIAGONAL SHEETING OF DOUGH
Filed Dec. 27, 1951     2 Sheets-Sheet 2
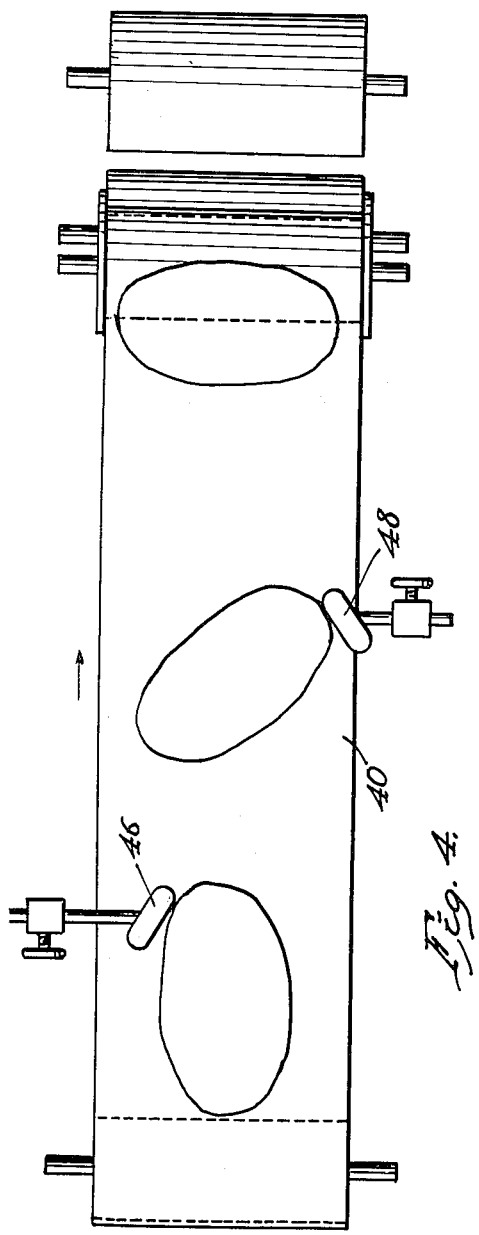
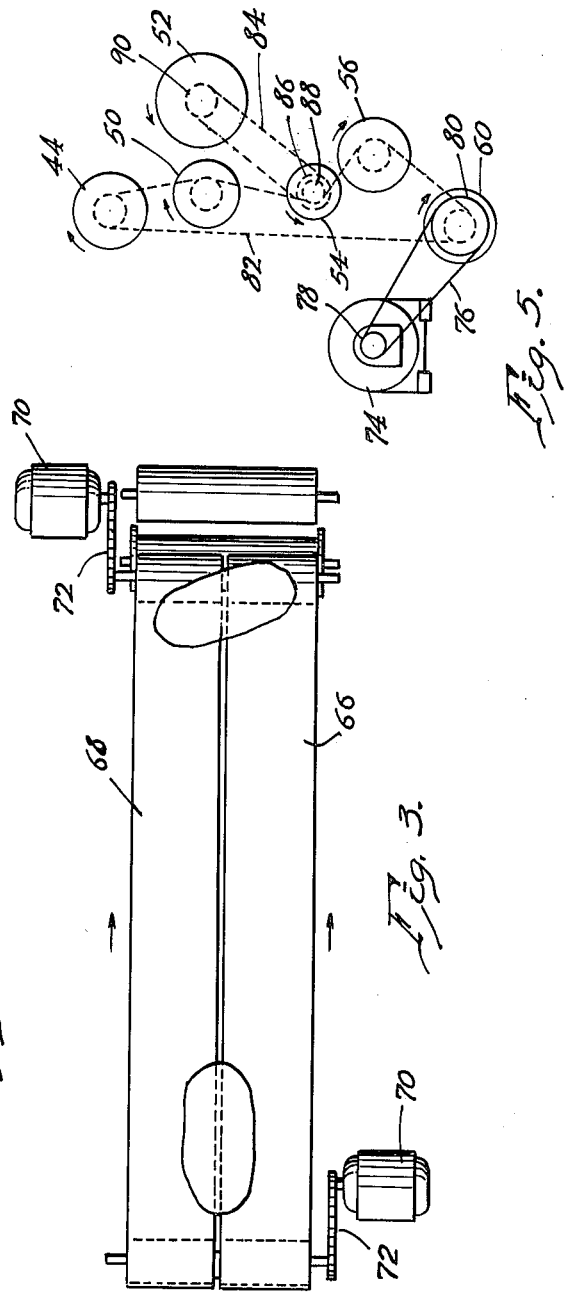
INVENTOR.
Francis F. Hansen.
BY
Christy, Parmelee and Strickland
ATTORNEYS

United States Patent Office 2,735,382
Patented Feb. 21, 1956

2,735,382

CROSS OR DIAGONAL SHEETING OF DOUGH

Francis Frederick Hansen, Pittsburgh, Pa.

Application December 27, 1951, Serial No. 263,572

2 Claims. (Cl. 107—54)

This invention relates to cross or diagonal sheeting of bread dough. More particularly, the invention relates to method of and apparatus for sheeting dough in which the protein strands of dough which have been arranged to be substantially parallel to the longitudinal axis of a sheeted dough strip are subjected to a further sheeting action to cause the protein strands across the strip at approximately right angles or diagonally to the longitudinal axis of the strip to impart an improved texture and grain structure to the dough.

As dough is now prepared for commercial bread baking, the dough is measured in portions suitable for making a loaf of bread. One or two portions may be used in making the loaf. The portions are put through a moulding machine to be sheeted, rolled and panned ready for proofing. In the moulding machine, the dough is formed into a strip with the pre-sheeting rolls and with the sheeting rolls. In these strips the protein strands of the dough are arranged by a rolling compression and extrusion action into long strands which are arranged approximately parallel to the longitudinal axis of the strip formed by the sheeting operation. This arrangement of strands forms a strip which is quite strong and will present considerable resistance to stretching in a direction parallel to the longitudinal axis of the strip. However, if a stretching action is attempted in a direction transverse to the longitudinal axis of a sheeted strip, the dough has comparatively no strength and will readily part or separate along the parallel protein strands showing that the cellular texture of the dough is no uniform, but is made up of long loosely bound strings or strands which form the so-called grain texture that is apparent in the bread which is baked from such dough.

Another important function of the sheeting operation is to remove the gas in the dough passing through the sheeting rolls. The longitudinal strands of dough in a sheeted strip as described above have a very definite influence on the proofing or rising of the pan loaf so that it does not rise uniformly throughout the width and length of the loaf. The long strand structure also tends to form large holes in the loaf due to the accumulation of gas in pockets during the proofing and baking operations.

The primary object of the present invention is to provide a method of and apparatus for sheeting dough which will produce a loaf of baked bread having a substantially uniform cellular structure throughout the loaf.

Another object of the invention is to provide a method of and apparatus for sheeting bread dough which has a uniform cellular structure throughout, and which is strong to resist stretching in a transverse direction and in a longitudinal direction of the sheeted strip of dough.

A further object of the invention is to provide a method of and apparatus for sheeting bread dough which will fully de-gas the dough and form a dough which will have a more uniform spring and that will not produce large holes in the loaf of bread baked from the sheeted dough.

With these and other objects in view, the invention consists in the method of and apparatus for sheeting bread dough as hereinafter illustrated and described in the specification and particularly defined in the appended claims.

The various features of the invention are illustrated in the accompanying drawings in which:

Fig. 1 is a diagrammatic view illustrating an apparatus having pre-sheeting and primary sheeting rolls for carrying out a preferred method of the invention;

Fig. 2 is a diagrammatic view illustrating an apparatus having pre-sheeting rolls and first and second sheeting rolls for carrying out a preferred form of the invention;

Fig. 3 is a plan view of a divided conveyor belt for shifting the position of a strip of sheeted dough thereon as it passes from one set of sheeting rolls to the following set of sheeting rolls;

Fig. 4 is a plan view of a single belt for carrying a strip of sheeted dough from one set of sheeting rolls to the following set of rolls with a pusher mechanism for turning or shifting the strip on the belt before it enters the following set of sheeting rolls; and Fig. 5 is a diagrammatic view illustrating a motor and sprocket chain drive for the belts and second set of sheeting rolls of the apparatus illustrated in Fig. 2.

When a body of dough is passed between a set of sheeting rolls it is elongated and made quite thin (from one-eighth to one inch in thickness). The sheeting action consists of compression, kneading and extrusion actions, and may include a shearing action. The sheeting action de-gases the dough and acts to arrange the protein material of the dough in long strands which extend approximately parallel to the longitudinal axis of the sheeted strip as it emerges from the rolls. I have found that if a strip of sheeted dough is again sent through sheeting rolls with its prior formed longitudinal axis arranged at an angle to (diagonal or approximately right angles to) the longitudinal axis being formed by the second set of sheeting rolls the protein dough strands will be re-arranged and cross-woven into a lattice-like structure. The usual long parallel protein strands will disappear and the cellular texture will be fine grained and quite uniformly arranged throughout the body of the dough.

The cross or diagonal sheeting operation is very effective in de-gasing the dough and allows the sheeted strip to be curled either longitudinally or transversely of the sheeted strip to prepare the dough for panning. Further, the sheeted strip is strong and will resist stretching either longitudinally or transversely thereof.

To carry out the method with the apparatus illustrated in Fig. 1, a lump of dough 10 is passed between pre-sheeting rolls 12 and 14. The dough is elongated and made thin as it is deposited on a belt 16 which runs between drive pulleys 18 and 20. The lump of dough 10 is deposited as an elongated elliptical shaped strip such as illustrated in Figs. 3 and 4. With the longitudinal axis constituting the long axis of the ellipse, the protein strands of the dough will be arranged approximately parallel to the long axis. While the dough is being transferred on the belt 16 from the pre-sheeting rolls to the first set of sheeting rolls 22 and 24, the position of the dough strip on the belt is changed or shifted such as illustrated in either Figs. 3 or 4 so that the longitudinal axis of the strip is arranged diagonally or at right angles to the line of travel of the belt.

The shifted strip of dough enters the first set of sheeting rolls at an angle to the longitudinal axis of the strip that is formed by the first set of sheeting rolls. As the strip emerges from the first set of sheeting rolls, it is received upon curling rolls 26 and 28 which curl the strip of dough into a roll 30 which when curled is over-balanced and deposited by the roll 28 on a belt 32. The belt 32 carries the curled roll 30 under a rolling plate 34 to consolidate and form the roll into a proper shape for panning.

Referring to Fig. 2, a lump of dough 10 passes between pre-sheeting rolls 12 and 14 to be elongated and made thinner and deposited on a belt 16 which runs between pulleys 18 and 20. The strip of dough has its position shifted on the belt 16 before it passes from the belt 16 to enter the first set of sheeting rolls 36 and 38. The strip of dough may have its longitudinal axis, as formed by the pre-sheeting rolls, set to either an acute angle or at right angles to the line of travel of the belt as shown in Fig. 4, and, therefore, the dough will be diagonally or cross sheeted as it passes between the rolls 36 and 38. The strip of dough formed by the first set of sheeting rolls is deposited upon a belt 40 which runs between drive pulleys 42 and 44. As the strip of dough is carried by the belt 40, the strip is shifted on the belt by means of adjustable abutments 46 and/or 48 which are mounted above the belt in close proximity to the surfaces of the belt so that the strip will engage the faces thereof. The abutments are adjusted to a position where they may act to shift the position of the strip of dough on the belt into the diagonal position illustrated in Fig. 4, or into the perpendicular position also illustrated in Fig. 4. The shifted strip of dough then passes from the belt 40 through the second set of sheeting rolls 50 and 52 to be again diagonally or cross-sheeted by the rolls. The cross-sheeted strip is then received by curling rolls 54 and 56 to be curled into a roll which is deposited on a belt 58 which moves between driving rolls 60 and 62. The curled strip is deposited as a roll on the belt and passes under a rolling plate 64 to be consolidated and formed into proper shape for panning.

The turning or shifting of the strip of dough on the belts 16 and 40 is illustrated in Figs. 3 and 4. In Fig. 3 the belt consists of two separately driven belts 66 and 68. Each belt is driven by a motor 70 and sprocket chain 72 at a predetermined speed. As illustrated in Fig. 3, the belt 68 is driven at a higher speed than the belt 66 in order to shift or turn the strip upon the belt. Preferably, one of the motors 70 is a variable speed motor so that the relative speeds of the two belts may be varied in order to obtain the desired shifting or turning of the strip on the belt before it enters a set of sheeting rolls.

Rotation of the sheet through any desired angle between 5° and 90° may be obtained. It has been found that with bread dough made from white flour, a shifting of the dough strip on the belt to bring its axis at an angle of about 45° to the line of travel of the belt will give a diagonal sheeting of the dough, which imparts a fine cellular structure to the dough and makes the diagonally sheeted strip strong to resist stretching both longitudinally and transversely.

It has been found that the diagonal sheeting of dough is very effective in de-gasing the dough, and making a fine grain structure. This type of dough rises uniformly in the proofing action, and avoids the development of large holes in the finished baked loaf of bread. Furthermore, the dough spring in the proofing action is more uniform than with a dough which has the protein strands arranged substantially parallel to the longitudinal axis of a sheeted strip.

In my copending application, Serial No. 261,288, filed December 12, 1951, I have illustrated and described a method of sheeting dough in which a rupturing or shearing action is used in conjunction with the compressing, kneading and extrusion actions which are usually used in the sheeting operation. As illustrated in Figs. 1 and 2, sheeting rolls 24, 38 and 52 are larger in diameter than the sheeting rolls 22, 36 and 50 so that when the large rolls are rotated at the same R. P. M. as the small rolls 22, 36 and 50 a shearing or rupturing action takes place which greatly improves the texture of the dough. With this rupturing action, in addition to the cross or diagonal sheeting action, the texture of the dough is improved. The sheeting rolls may have the same diameter and may be rotated at different rates of speed to obtain the cross and diagonal sheeting if desired and still obtain a satisfactory product.

In Fig. 5 is illustrated a driving mechanism for the belt drive pulley 44, the rolls 50, 52, 54, 56 and 60. A motor 74 drives a belt 76 which extends between a pulley 78 on the motor and a pulley 80 on the axle of the drive pulley 60. Sprocket gears are mounted on each of the axles of the rolls 44, 50, 56 and 60 around which a sprocket chain 82 runs to drive the various rolls. A sprocket chain 84 runs from a sprocket gear on the axle 88 to a sprocket gear 90 on the axle for the roll 52. If desired, the chain may be extended to drive the pre-sheeting rolls and first set of sheeting rolls with the same motor 74. In many cases, however, it is best to use separate motors and drive chains for driving for the pre-sheeting rolls and the first and second sets of sheeting rolls and the belts.

The preferred form of the invention having been thus described, what is claimed as new is:

1. In the method of preparing dough for baking, the steps of rolling the dough into a flat sheet, supporting the flat sheet on a level support and advancing it to be further rolled, revolving the sheet in a horizontal plane relative to the direction in which it is being advanced, and subjecting it to a second rolling operation after it has been revolved a dstance such that the second rolling elongates the dough at an angle to the direction in which it was first elongated, and thereafter curling the sheet into a loaf form.

2. The method defined in claim 1 in which the second rolling is effected between rolls operating at relatively different peripheral speeds to facilitate the release of gas from the dough.

References Cited in the file of this patent

UNITED STATES PATENTS

| | | |
|---|---|---|
| 821,860 | Colborne et al. | May 29, 1906 |
| 827,936 | Obermaier | Aug. 7, 1906 |
| 1,212,011 | Brugman | Jan. 9, 1917 |
| 1,249,294 | Sonsthagen | Dec. 4, 1917 |
| 1,616,101 | Ackley | Feb. 1, 1927 |
| 1,763,620 | Wolfarth et al. | June 10, 1930 |
| 1,871,753 | Smith | Aug. 16, 1932 |
| 1,951,549 | Kirchhoff | Mar. 20, 1934 |
| 2,157,192 | Thurlings | May 9, 1939 |
| 2,275,714 | Anetsberger et al | Mar. 10, 1942 |
| 2,431,074 | Palmer | Nov. 18, 1947 |
| 2,479,864 | Rhodes | Aug. 23, 1949 |
| 2,526,944 | Grainger | Oct. 24, 1950 |
| 2,534,734 | Rhodes | Dec. 19, 1950 |
| 2,604,057 | Rhodes | July 22, 1952 |
| 2,642,012 | Sticelber | June 16, 1953 |